United States Patent [19]

Murray

[11] Patent Number: 5,400,933
[45] Date of Patent: Mar. 28, 1995

[54] GOLF BAG CARRIER FOR A VEHICLE

[76] Inventor: Walter D. Murray, 1339 Sunny Dr., Eugene, Oreg. 97404

[21] Appl. No.: 213,723

[22] Filed: Mar. 16, 1994

[51] Int. Cl.6 ............................................. B60R 9/08
[52] U.S. Cl. ................... 224/42.32; 224/42.38; 224/42.45 R; 224/274; 296/37.16
[58] Field of Search ............... 224/42.38, 42.39, 42.42, 224/42.45 R, 42.45 A, 274, 42.03 B, 42.07, 42.32, 42.46 R, 90.17; 280/DIG. 5, DIG. 6; 296/37.16; 248/503.1, 535, 96, 97, 220.4, 221.3, 222.1, 223.3, 503; 211/204, 206, 113

[56] References Cited

U.S. PATENT DOCUMENTS

| | | | |
|---|---|---|---|
| 1,313,959 | 8/1919 | Smith | 224/42.39 |
| 1,475,605 | 11/1923 | Smith | 224/42.39 |
| 1,500,067 | 7/1924 | Frisk | 224/42.39 |
| 1,683,169 | 9/1928 | De Noya | 224/42.39 |
| 3,896,937 | 7/1975 | Christian | 211/113 |
| 4,355,746 | 10/1982 | Cassady | 224/274 |
| 4,533,013 | 8/1985 | Hightower | 180/210 |
| 5,052,604 | 10/1991 | Tourangeau | 224/274 |

*Primary Examiner*—Henry J. Recla
*Assistant Examiner*—Timothy L. Maust
*Attorney, Agent, or Firm*—James D. Givnan, Jr.

[57] ABSTRACT

An upright cargo support includes a post having an angular lower segment provided with a base for floor engagement. A pair of feet on the base are recessed to engage hold-down pins of the floor structure. One of said feet includes a locking element to secure the base against movement. An arm structure on the post is equipped with a strap to confine golf bags or other cargo against displacement. A bar interconnects a pair of cargo support structures to brace the structures as well as to support additional articles to be transported.

5 Claims, 1 Drawing Sheet

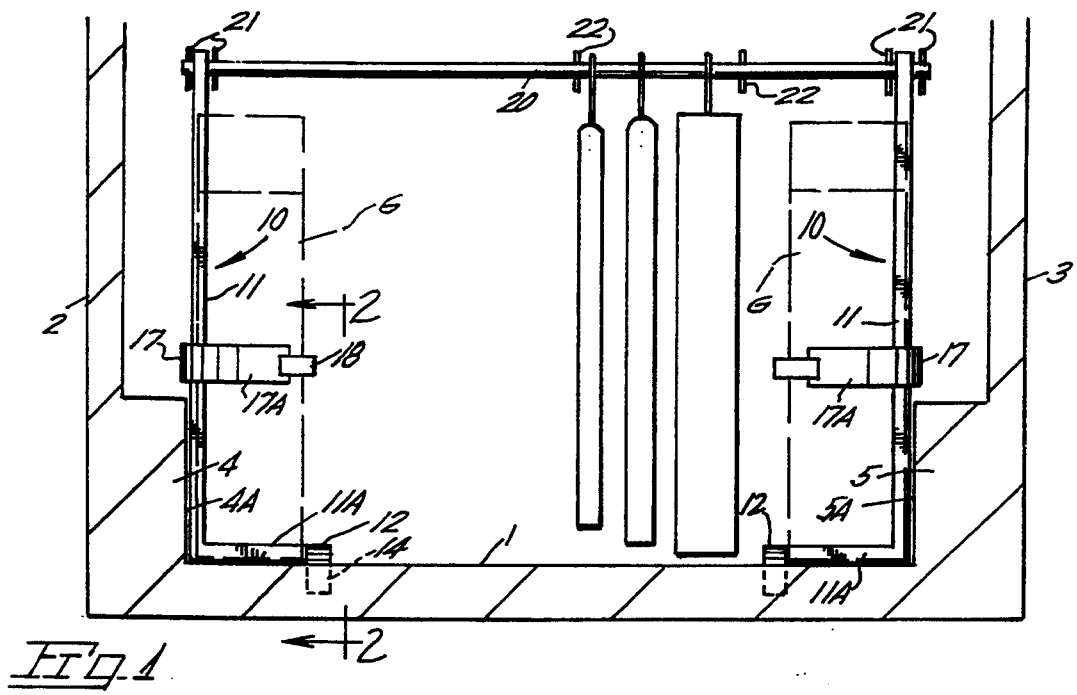
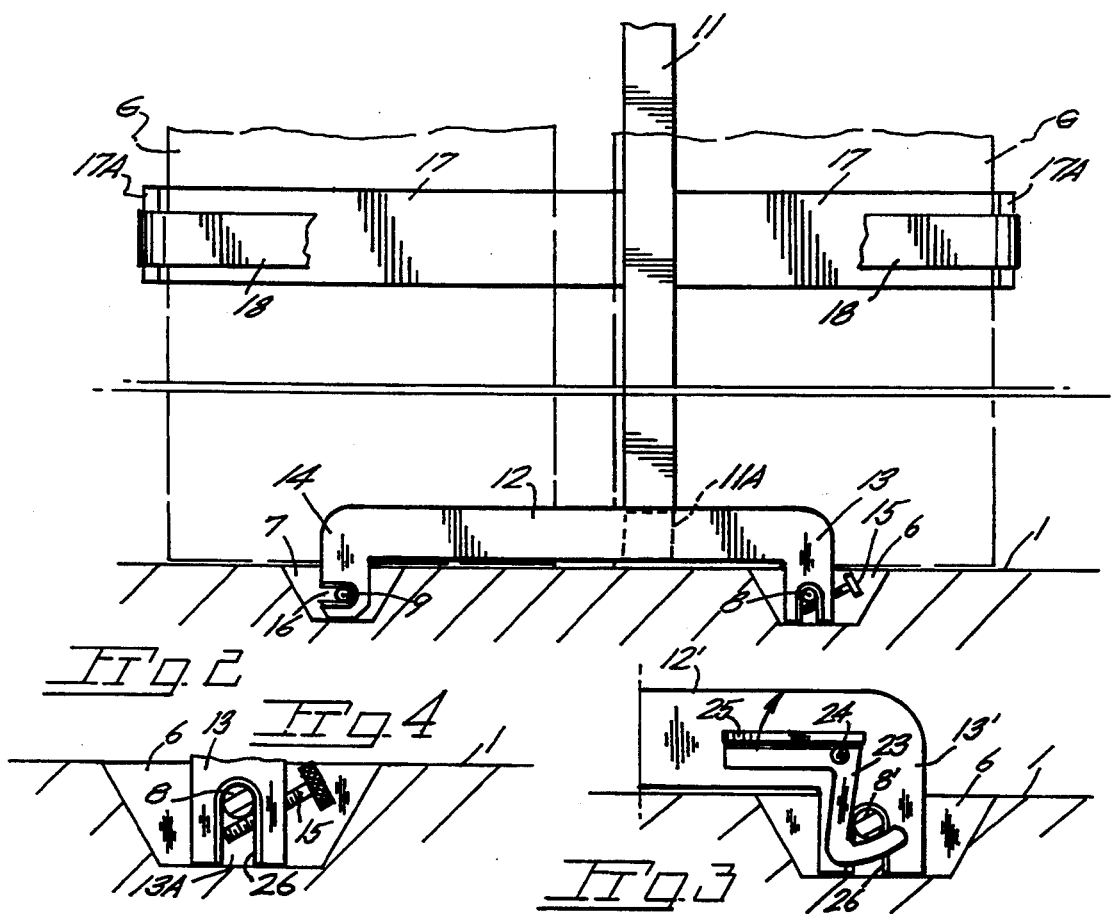

GOLF BAG CARRIER FOR A VEHICLE

BACKGROUND OF THE INVENTION

The present invention pertains generally to structures for installation in a vehicle for confining bulky items in place during transit.

The transport of two or more golf bags in a passenger vehicle constitutes a problem in that such bags are both heavy and bulky and difficult to secure against shifting, particularly if the vehicle is subjected to severe braking or rough roads. The practice of laying one or more golf bags on their side in a cargo area of a van is objectionable for several reasons, the primary reason being that the bag or bags may be displaced during braking or in an accident with risk of injury to vehicle occupants. A secondary objection to such storage of golf bags within a vehicle is the risk of damage to the bags and clubs. Placement of golf bags on their sides during transport is objectionable as clubs tend to shift or slide from the bag.

In the prior art, U.S. Pat. No. 1,313,959 discloses a golf bag holder for attachment to the running board of a vehicle by means of threaded shafts and wing nuts. U.S. Pat. No. 1,500,067 discloses a golf bag carrier also for attachment to a vehicle running board and not feasable with current automotive designs. U.S. Pat. No. 4,355,746 discloses a golf cart wherein a series of arms project at an angle with each arm supporting a golf bag. U.S. Pat. No. 4,533,013 also discloses a golf cart with external platforms and post structures located adjacent the rear of the vehicle for receiving golf bags. None of the known prior art is directed toward the secure retention of a golf bag within the cargo space of a passenger van or the like.

BRIEF DESCRIPTION OF THE DRAWINGS

In the accompanying drawings:

FIG. 1 is a vertical sectional view of a vehicle cargo area with the present carrier in place;

FIG. 2 is a vertical elevational view taken along line 2—2 of FIG. 1 showing base and post structure of the present carrier;

FIG. 3 is a vertical sectional view of a portion of a modified carrier having a pivoted locking means; and FIG. 4 is a vertical sectional view of a base foot and vehicle floor structure.

DETAILED DESCRIPTION OF THE PREFERRED EMBODIMENTS

With continuing attention to the drawings, wherein applied reference numerals indicate parts similarly hereinafter identified, the reference numeral 1 indicates floor structure of a vehicle while reference numerals 2 and 3 indicate side wall structure of the vehicle. Wheel well housings at 4 and 5 include vertical surfaces 4A and 5A. Floor structure 1 of a van type vehicle commonly includes pairs of front and rear sockets at 6 and 7 each having a crosswise extending hold-down pin at 8 and 9. Typically hold-down pins 8 and 9 cooperate with seat structure to removeably couple said seat structure to the vehicle floor.

With attention now to the present carrier, the same includes upright cargo supports indicated generally at 10. As the supports are of like construction the following description of one of said supports is applicable to remaining support 10.

Upright cargo support 10 includes a post 11 having an angulated horizontal lower segment 11A adjacent the vehicle floor surface. Post segment 11A is integral with a base 12 which, when in place, extends fore and aft of the vehicle and terminates at a forward end in a first foot 13 and terminates rearwardly in a second foot at 14. First foot 13 has an upright recess 13A therein which engages front hold-down pin 8 of the type noted. A locking element at 15 is insertable below pin 8 to prevent upward displacement of foot 13 during vehicle travel. Second foot 14 defines a horizontally orientated recess 6 in which is received hold-down pin 9 with attachment to the pin achieved by positioning base 12 to an inclined position for initial pin engagement with subsequent lowering of the base to the horizontal position shown in FIG. 2. Subsequent to lowering to the horizontal position, base 12 is locked in place by passage of locking element 15 below locking pin 8.

The post 11 includes laterally projecting arms 17 with inwardly curved end segments 17A of each arm end receiving a strap 18 which, when closed, confines a golf bag at G into place against the arm of each post structure. For ease of construction, the arm structure may be fabricated from a single length of plate material while the post structure is preferably of metal tubing.

The upper end of arm structure 11 is apertured to receive the end of bar 20 which, when the present carrier is utilized with a pair of upright supports 10, extends intermediate and connects the upper ends of post structures 11 and is secured thereto by inserted pairs of quick release locking pins 21. Such pins are of the type having a spring biased ball element preventing separation. Additional such pins at 22 extending through bar 20, serve to confine articles, such as garments, supported along the bar against displacement.

A modified form of locking element 23 is shown in FIG. 3, wherein a base 12' has a foot 13' which engages a locking pin 8'. The locking element is embodied within a hook 23 pivotly attached at 24 to post structure base 12'. A finger grip 25 permits manipulation of element 23.

Preferably each foot defined recess is provided with a non-metalic liner 26 to isolate each foot 13 and 14 from direct contact with its respective hold-down pin for rattle-free attachment.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A golf bag carrier for installation in a vehicle having a horizontal surface with horizontally disposed hold-down pins therein and including, a base adapted to be mounted on said horizontal surface, a post structure on said base and extending upwardly therefrom, arm means on said post structure for engagement with a golf bag and including a closure for confining a golf bag in place, said base having a first foot member and a second foot member, said first foot member having a horizontally extending recess to receive one of said hold-down pins of the vehicle, said second foot member having an upright extending recess to receive another of said hold-down pin of the vehicle, and adjustable locking means carried by said second foot member and intersecting said upright extending recess to prevent upward movement of the second foot member when the vehicle is in motion, said adjustable locking means retractable to open said upright extending recess to permit upward displacement of the second foot member for carrier removal from the vehicle.

2. The golf bag carrier claimed in claim 1 additionally including a second carrier of like construction, a connector coupling the first mentioned post structure to the post structure of the second carrier.

3. The golf bag carrier claimed in claim 2 wherein said connector includes a bar, pin means engageable with the bar at points therealong.

4. The golf bag carrier claimed in claim 3 wherein said pin means includes pins oppositely disposed from and proximate the first mentioned post structure.

5. The golf bag carrier claimed in claim 1 wherein said post structure includes a horizontal lower segment for positioning a major portion of the post structure adjacent a side of the vehicle.

* * * * *